United States Patent Office 3,016,295
Patented Jan. 9, 1962

3,016,295
METHOD FOR ALTERING THE GROWTH CHARACTERISTICS OF PLANTS
Sidney H. Davidson, Wilmington, Del., and Charles J. Delp, Bradenton, Fla., assignors to E. I. du Pont de Nemours and Company, Wilmington, Del., a corporation of Delaware
No Drawing. Filed June 23, 1958, Ser. No. 743,985
5 Claims. (Cl. 71—2.7)

This invention relates to processes and compositions for altering the growth characteristics of a plant by supplying to the plant a compound selected from the group consisting of:

(1)

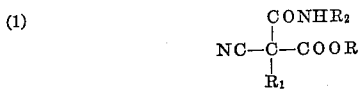

where R is alkyl of from to 1 inclusive, and preferably 1 to 2 inclusive, carbon atoms, or

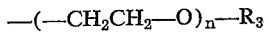

where $n$ is the integer 1 or 2 and $R_3$ is methyl or ethyl; $R_1$ is hydrogen or a metal ion; and $R_2$ is hydrogen or alkyl of from 1 to 3 carbons inclusive.

In the above formula the metal ions represented can be, for example, sodium, potassium, lithium, magnesium, calcium, aluminum, zinc, copper, iron, molybdenum, or manganese.

The alkyl groups in the above compounds advantageously have the number of carbon atoms specified, and particular advantages are obtained when the stated preferred number of carbon atoms are present. The alkyl groups can be straight or branched chain.

It will be understood that certain of the compounds employed in the above-described formulations can exist in their enolic form. For example:

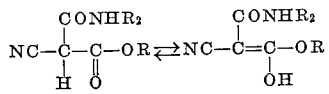

and

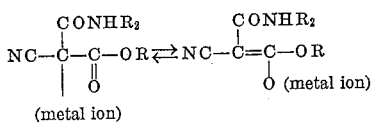

We have found that the compounds of Formula 1 can be used in the processes and compositions of the invention to alter the growth characteristics of plants. The compound can be supplied to a plant by adding it to the soil in which the plant is growing or in which seed will be planted. Alternatively, the seeds can be treated with the compounds. Often it will be found simplest to apply the compounds in a dust formulation or in a liquid formulation to the foliage of the plant.

Depending on the amount of the above compounds used, as well as the concentration, formulation, time of application, and the part of the plant being treated, the influence of the treating compound on the growth characteristics of the plant can be inhibitory in nature, stimulatory in nature, or a combination of these.

Out standing illustrations of the modification of plant growth characteristics which can be cited include the following:

(1) Increase in amount of fruit produced, thereby allowing more economic production of fruit;
(2) Increase in root growth, thereby achieving an increase in the yield or weight of tubers and root crops;
(3) Better overall growth of plants due to increased root system;
(4) Increase in tillering (basal sprouting), resulting in denser stand of forage grasses;
(5) Increase in amount and yield of sugar stored in plants by reducing seed head formation in grasses;
(6) Increase in vegetative growth, of particular advantage in forage crops such as alfalfa;
(7) Improvement in health including growth and yield of plants, such as by preventing the formation of suckers in tobacco;
(8) Prolongation of the utility of grasses for pasturage by retardation or complete inhibition of seed formation by the plant;
(9) Increase in the number of blossoms;
(10) Change in the formation of flowers and blossoms;
(11) Alteration in the time of setting of fruit;
(12) Delay of maturity of plants, including delay of germination, delay of blossoming, and prolongation of the harvest state of fruits and vegetables;
(13 Decrease in the number of blossoms, resulting in effective thinning;
(14) Inhibition of sprout production on potatoes; and
(15) Decrease in productivity of fruit.

It will be understood that the induction of these effects on plants is controlled, among other things as stated above, by the rate of the compounds applied and the stage of growth of the plants at the time of treatment.

Particularly outstanding test results have shown a remarkable increase in production of roots of plants upon treatment according to this invention. For example, upon application to the roots of plants by irrigation of the soil containing the plants, as well as alternatively by application as a foilage-soil spray to the plant, comparison in five actual tests of the effects on root production on a weight basis with control plants not so treated showed an increase in weight in the plants treated according to this invention of 188%, 204%, 220%, 131% and 186%, expressed as a percent of the control plants.

Upon application in one illustrative procedure at the optimum stage of growth on beans, a consistent increase in the number of leaves, with a surprising increase in the total surface area of leaves, was noted. It is highly unusual to find a group of compounds that cause an increase in the total surface area of leaves, thereby increasing the photosynthesizing potential of the plant. This increase in total surface area was accompanied by an increase in total fresh weight of leaves when compared to control (untreated) plants at 38 days after treatment. In these same tests it was noted that plants treated with compounds of this invention stayed green and continued to form leaves at least 20 days longer than the control plants. Thus, there was a definite prolongation of maturity with the treated plants.

In another series of tests with beans, it was found that the maturation of fruit, or time of harvest, can be extended by a treatment with the subject compounds. For example, it was found that all of the fruit on untreated plants was ready for harvest during the 9th and 10th week after planting while 46% of the fruit on the treated plants was harvested during the 14th and 15th week after planting.

Modification of the productivity of the plant is another outstanding influence on growth of particular advantage that can be obtained by the practice of this invention. If the amount of a compound used is moderately small, then an increase in productivity can be expected. If larger amounts of a compound are used, the productivity can be diminished.

In other words, using compounds according to the invention at rather a wide range of amounts, the productivity of plants can be greatly modified. Thus about one-half pound per acre or more can be used depending upon the magnitude of the effect desired.

For application to foilage to increase the production of seeds or fruit there can be used from about one-half pound to 10 pounds per acre. If the compounds are applied to the soil then from about 2 to 10 pounds per acre will be used, though more or less can be employed depending upon the type of plant, stage of growth of the plant, and growing conditions prevalent at the time of treatment.

As already indicated, by the use of much larger amounts the formation and production of fruit can be retarded. For this effect, amounts in excess of 15 pounds per acre and ranging up to 50 pounds per acre or even more can be used. It must be noted, however, that some compounds continue to give an increase in yield up to relatively large amounts. Thus, copper salts can be used at amounts up to 20 pounds per acre or even somewhat more, and an increase in the production of fruit will still be obtained.

The precise amount of a particular compound to be used will depend upon the plant and the stage of growth of the plant being treated, upon the character of the soil, in the case of application to soil, and upon a variety of other factors we l recognized in connection with the application of other chemicals to plants and soil. The optimum amount in each instance can be determined readily by means conventional in the art.

The compounds can be applied in any of a variety of compositions. Thus those that are sufficiently water soluble can be applied simply in water solution. It is preferred however, that the compounds be extended with a carrier material or conditioning agent of the kind used and commonly referred to in the art as a fungicidal, herbicidal, or an insecticidal adjuvant or modifier. Such adjuvants are inert solids, surface-active agents, and soil beneficiating agents.

The compounds shown above will be used in such compositions in sufficient amount so that they can exert an effect in modifying the productivity of plants. Usually from about 1 to 95% by weight of the compounds are included in such formulations.

Solid formulations can be prepared with inert powders. The formulations thus can be homogeneous powders that either can be used as such, diluted with inert solids to form dusts, or suspended in a suitable liquid medium for spray application. The powders usually comprise active ingredient admixed with minor amounts of conditioning agent. Natural clays (either absorptive such as attapulgite or relatively non-absorptive such as china clays), diatomaceous earth, walnut shell flour, redwood flour, synthetic fine silica, calcium silicate and other inert solid carriers of the kind conventionally employed in powder fungicidal compositions can be used. The active ingredient usually makes up from about 25–90% of these powder compositions. The solids ordinarily are very finely divided and have a particle size below about 50 microns and preferably below about 20 microns. For conversion of the powders to dusts talc, pyrophyllite, tobacco dust, volcanic ash and other dense, rapid-settling inert solids customarily are used.

If the active compound used is water soluble, it can be sprayed onto or in any other desired manner applied to an absorptive powder, or granules made from such powders, which can then be dried to produce a dry product. Any of the above absorptive materials can be used for the preparation of such products.

The solid materials used, instead of being entirely inert, can be materials which will benefit the plants or soil being treated. Thus urea, ammonium sulfate, and fertilizers in general can be used as carriers for the active compounds to be used according to the invention. The amounts are as above indicated and the carriers can be added simply by mixing.

Liquid compositions including the active compounds above described can be prepared by admixing the compound with a suitable liquid diluent medium. The active compound can be either in solution or in suspension in the liquid medium. Typical of the liquid media commonly employed are kerosene, Stoddard solvent, xylene, alkylated naphthalene, glycols, and ketones such as diisobutyl ketone, cyclohexanone, etc. The active ingredient usually makes up from about 0.5 to 50% of these liquid compositions. Some of these compositions are designed to be used as such, and others to be extended with large quantities of water.

Compositions in the form of wettable powders or liquids can also include one or more surface-active agents such as wetting, dispersing or emulsifying agents. Thus, mixtures of the above liquids with the active compounds can contain an emulsifying agent to make an emulsifiable oil composition. The surface-active agents cause the liquid or dry compositions to disperse or emulsify easily in water to give aqueous sprays.

The surface-active agents employed can be of the cationic, or preferably the anionic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Sanitary Chemicals," August, September and October of 1949.

The compounds can be applied in compositions of the types shown in Jones U.S. Patent 2,412,510 in which an active compound of the invention replaces the active materials of that patent in the composition shown and in like amounts. Similarly, any of the carriers, additives or surface-active agents there named or referred to can be used.

In order that the invention may be better understood, the following specific illustrative examples are given in addition to those already above indicated.

Methods of preparation for many of the compounds of this application are given in the literature. For example, the preparation of 2-cyanomalonamic acid, methyl ester is described in Chem. Zentralblatt, 37, 74 (1913) (Beil., 25, 209).

The preparation of compounds not reported in the literature is described in the following section entitled "Preparation Examples."

PREPARATION EXAMPLES (1) *Preparation of 2-cyanomalonamic acid, dodecyl ester*

Fifty grams of dodecylcyanoacetate and 10.7 grams of potassium cyanate are mixed together and heated with stirring to 200° C. for 15 minutes. Cooling is followed by the addition of 500 cc. ether. Filtration gives a brown precipitate which is dissolved in 100 cc. of water. Addition of a solution of 25 grams sulfuric acid in 150 cc. water gives a tan precipitate. Crystallization from cyclohexane gives the desired product in a pure state.

(2) *Preparation of 2-cyanomalonamic acid, ester with ethylene glycol, monoethyl ether*

A mixture of 31.4 grams of cyanoacetic acid, ester with ethyl Cellosolve (prepared from cyanoacetic acid and ethyl Cellosolve via a Fischer esterification) and 14.6 grams of potassium cyanate in 30 cc. dimethyl formamide is stirred at 160° C. for one-half hour. The reaction mixture is cooled and poured into 200 cc. benzene. The oily precipitate is removed by filtration and dissolved in water. Acidification gives a light tan solid, which is crystallized from benzene to give the desired product.

(3) *Preparation of 2-cyanomalonamic acid, ester with ethylene glycol, monomethyl ether*

2-cyanomalonamic acid, ester with methyl Cellosolve is prepared by a method similar to that described above from cyanoacetic acid, ester with methyl Cellosolve and potassium cyanate.

(4) *Preparation of 2-cyanomalonamic acid, ester with diethylene glycol, monomethyl ether*

2-cyanomalonamic acid, ester with diethylene glycol, monomethyl ether is prepared by the method described in Example 2 from cyanoacetic acid, ester with diethylene glycol, monomethyl ether and potassium cyanate.

(5) *Preparation of cyanomalonamic acid, ester with diethylene glycol, monoethyl ether*

2-cyanomalonamic acid, ester with Carbitol is prepared by the method described in Example 2 from cyanoacetic acid, ester with diethylene glycol, monoethyl ether and potassium cyanate.

(6) *Preparation of cyanomalonamic acid, ethyl ester, copper salt*

A hot, aqueous solution (500 ml.) of 2-cyanomalonamic acid, ethyl ester (15.6 g., 0.1 mole) is mixed with a hot aqueous solution (250 ml.) of cupric acetate (25 g.). On cooling, light green crystals (8 g.) slowly form. Analysis indicates that they are the cupric salt of ethyl cyanomalonamate.

Analysis.—Calc'd. for $CuC_{12}H_{14}N_4O_6 \cdot 2\frac{1}{2}H_2O$: Cu, 15.2; C, 39.40; H, 4.53; N, 13.35. Found: Cu, 16.23, 16.14; C, 39.41, 39.31; H, 4.42, 4.42; N, 13.15, 13.06.

(7) *Preparation of 2-cyanomalonamic acid, methyl ester, iron (III) salt*

A hot aqueous solution (500 cc.) of 2-cyanomalonamic acid, methyl ester (15.6 g.; 0.1 mole) is mixed with a hot aqueous solution (250 cc.) of ferric chloride (16.2 g.). On cooling, the crystalline product is precipitated.

(8) *Preparation of 2-cyano-N-ethylmalonamic acid, methyl ester*

To a slurry of 2.3 g. of powdered sodium in 150 cc. of anhydrous ether is added 9.9 g. of methyl cyanoacetate. The mixture is brought to reflux and 55 g. of ethyl isocyanate are added. After the reaction mixture is refluxed for one hour, the resulting slurry is filtered. The solids are then dissolved in 1 liter of water and concentrated hydrochloric acid is added in excess. The solid precipitate is recovered by filtration, washed with water and dried. The product is 2-cyano-N-ethylmalonamic acid, methyl ester and after recrystallization from toluene, it has a melting point of 125–126° C.

(9) *Preparation of 2-cyano-N-methylmalonamic acid, methyl ester*

2-cyano-N-methylmalonamic acid, methyl ester is prepared by the method of Example 9, using methyl isocyanate and the sodium salt of methyl cyanoacetate.

(10) *Preparation of 2-cyano-N-isopropylmalonamic acid, ethyl ester*

2-cyano-N-isopropylmalonamic acid, ethyl ester is prepared by the method of Example 9 using isopropyl isocyanate and the sodium salt of ethyl cyanoacetate.

FORMULATION AND USE EXAMPLES

Example 1

| | Percent |
|---|---|
| 2-cyanomalonamic acid, ethyl ester | 80 |
| Alkyl naphthalene sulfonic acid, Na salt | 1 |
| Low viscosity methyl cellulose | 0.25 |
| Attapulgite clay | 18.75 |

The above components are first blended together in a ribbon blender, then passed twice through a micropulverizer with an 0.020 inch round hole screen. The resulting powder wets readily into water to yield a good dispersion.

This formulation is applied in 100 gallons water at rates of 4 to 8 pounds per acre (active) as a soil foliage spray to pinto beans, Black Valentine beans, soybeans, peas and tomatoes at three weeks after emergence. Thirty days later the treated plants have greatly increased numbers of flowers and leaves. At harvest time an increased weight (compared to untreated control plants) of pods, seed or fruit is obtained. At rates of 20 to 40 pounds per acre, prolongation of maturity with a decrease in yield of pods, seeds and fruits is noted.

Example 2

| | Percent |
|---|---|
| 2-cyanomalonamic acid, methyl ester, Na salt | 50 |
| Sodium hexametaphosphate | 2 |
| Kaolin clay | 48 |

The above components are blended and micropulverized. When placed in water the active component dissolves and the clay remains as a highly dispersed suspension which will act as a tracer to measure foliage coverage.

The above formulation is applied in 100 gallons water at rates of 4 to 8 pounds per acre (active) as a soil-foliage spray to pinto bean, tomato, Black Valentine bean and Clinton oats at three weeks after emergence. At 40 days after treatment, an increase of 25 to 100% in dry green weight of roots is noted in comparison with untreated plants.

Example 3

| | Percent |
|---|---|
| 2-cyanomalonamic acid, methyl ester, ½ $Cu^{++}$ salt | 50 |
| Diatomaceous silica | 48.5 |
| Sodium lauryl sulfate | 0.5 |
| Sodium lignin sulfonate | 1.0 |

The above components are blended and micropulverized until the active component is substantially all below 50 microns in particle size. The product then wets and disperses readily in water.

This product is mixed with 100 gallons of water and applied at the rate of 6 pounds (active) per acre to wax beans (2nd trifoliate leaf expanding), Kentucky Wonder pole beans (same stage), established alfalfa (early spring application), roses (early spring application) and chrysanthemums (plants 3 inches high). At 30 days after treatment, an increase in number of flowers and leaves is evident on beans. At harvest time an increase in yield of seed and fruit is recorded. This treatment increases the seed yield and forage yield of alfalfa. In the case of roses and chrysanthemums, an increase in the number of marketable flowers results.

Example 4

| | Percent |
|---|---|
| 2-cyanomalonamic acid, ester with ethylene glycol monomethyl ether | 25 |
| Diisobutylketone | 70 |
| Alkyl, aryl polyether alcohol | 5 |

The above components are simply stirred together until a homogeneous solution results. This emulsifiable oil blooms spontaneously when added to water to yield a stable emulsion.

When applied at the rate of 8 pounds (active) per acre in 150 gallons water to tomato plants (3 weeks after emergence), the yield of fruit is increased at harvest time.

Example 5

| | Percent |
|---|---|
| 2-cyano-N-ethyl malonamic acid, methyl ester | 3.25 |
| Attapulgite clay | 1.25 |
| 10–10–10 granular fertilizer | 95.5 |

The active material and attapulgite are first ground together through a micropulverizer then blended with the granular fertilizer. The product is then applied to sandy loam soil (ready prepared for seeding crops) with a fertilizer spreader at a rate of 450 pounds per acre. The soil is disc-harrowed and smoothed for planting. Pinto beans are planted in the treated area at a depth of one inch. This treatment results in marked axillary bud stimulation which gives an increase in flowers and fruits with a substantial increase in marketable beans.

This application is a continuation-in-part of our copending applications, Serial No. 537,544, filed September 29, 1955, and Serial No. 632,414, filed January 4, 1957 (both now abandoned), the latter being a continuation-in-part of our earlier application Serial No. 537,545, filed September 29, 1955, and now abandoned.

We claim:

1. The process of altering the growth characteristics of a plant comprising supplying to the plant, in an amount sufficient to alter the growth characteristics of the plant, a compound selected from the group consisting of:

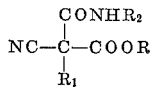

where R is a member of the group consisting of alkyl of up to and including 12 carbon atoms and

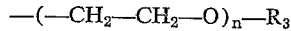

wherein $n$ is a whole number from 1–2 and $R_3$ is from the group consisting of —$CH_3$ and —$C_2H_5$; $R_1$ is a member of the group consisting of hydrogen, sodium, potassium, lithium, magnesium, calcium, aluminum, zinc, copper, iron, molybdenum and manganese; and $R_2$ is a member of the group consisting of hydrogen and alkyl of 1–3 carbon atoms.

2. In a process for altering the growth characteristics of plants, the step comprising supplying to the plant, in an amount sufficient to alter the growth characteristics of the plants, a cyanomalonamic acid, alkyl ester wherein said alkyl has from 1–12 carbon atoms.

3. The process as set forth in claim 1 wherein said compound is 2-cyanomalonamic acid, ethyl ester.

4. The process as set forth in claim 1 wherein said compound is 2-cyanomalonamic acid, methyl ester, sodium salt.

5. The process as set forth in claim 1 wherein said compound is 2-cyanomalonamic acid, methyl ester, cupric salt.

References Cited in the file of this patent

UNITED STATES PATENTS

| | | |
|---|---|---|
| 2,396,513 | Jones | Mar. 12, 1946 |
| 2,472,347 | Sexton | June 7, 1949 |
| 2,663,629 | Semon | Dec. 22, 1953 |

OTHER REFERENCES

Weintraub et al. in "Botanical Gazette," vol. 113, pages 348–362 (1952).

Pabst in "Chemical Abstracts," vol. 23, Col. 4193(4) (1929).

Beilstein: Handbuch der Organischen Chemie, Band XXV, System No. 3634–3793, page 209 (1936).